INVENTORS
Orland J. Gant, Jr.
Benjamin F. Gibson, V
William C. Pritchett

May 7, 1968  O. J. GANT, JR., ET AL  3,382,363
EPITHERMAL NEUTRON SCINTILLATION DETECTOR
Filed Nov. 5, 1964  3 Sheets-Sheet 2

INVENTORS
Orland J. Gant, Jr.
Benjamin F. Gibson, V
William C. Pritchett
BY
*Blucher S Tharp*
Attorney INVENTORS
Orland J. Gant, Jr.
Benjamin F. Gibson, V
William C. Pritchett
BY *Blucher S Sharp*
Attorney

United States Patent Office 3,382,363
Patented May 7, 1968

3,382,363
EPITHERMAL NEUTRON SCINTILLATION DETECTOR
Orland J. Gant, Jr., Dallas, Benjamin F. Gibson V, Lufkin, and William C. Pritchett, Dallas, Tex., assignors to Atlantic Richfield Company, a corporation of Pennsylvania
Filed Nov. 5, 1964, Ser. No. 409,158
5 Claims. (Cl. 250—83.1)

ABSTRACT OF THE DISCLOSURE

A scintillation detector to be used in an epithermal neutron logging sonde. Thermal neutron shielding material is located around the periphery of the detector; neutron moderating material is contained within the center portion of the detector; and scintillation material is positioned between the shielding material and moderating material. The scintillation material can be formed as one or more cylindrical shells or as a plurality of rods. Where the scintillation material is formed as a plurality of units, the individual units are separated by beta-absorbing material.

The present invention relates to new and useful improvements in neutron detecting apparatus and more particularly to scintillation detectors having high and selective sensitivity for epithermal neutrons.

Rocks of different lithology can often be correlated over wide areas by utilizing nuclear radiation detectors in the boreholes and recording continuous logs as the detector passes through various formations.

One of the most promising logging methods involves bombarding subsurface formations with fast neutrons and determining formation response in terms of resulting neutrons with epithermal energies. The count rate of the epithermal neutrons so produced is closely related to the hydrogen content of the rocks. Therefore, the relative hydrogen content of the various formations can be ascertained. Further, since water and hydrocarbons normally fill the pores and fissures of the formations, the epithermal neutron log furnishes a means of determining the relative porosities of the rock formations at the borehole.

Porosity measurements taken with an epithermal neutron detector compared with other radioactive logging systems have the important advantage of being largely unaffected by the salt content of the underground water. This is because chlorine has a small cross-section for capturing neutrons with epithermal energies. Thus, porosity is independent of the environmental salt content.

Epithermal count rates can be determined with several available scintillation detectors, however, the resulting logs are generally unreliable because the detectors have much less than the desired efficiency for detecting the epithermal neutrons. Also, conventional scintillation detectors have the disadvantage of being somewhat sensitive to gamma rays. As a consequence, of these defects and others, epithermal neutron logging, while recognized as having great potential, has failed to live up to expectations.

Accordingly, we set out to design an improved scintillation detector for epithermal neutrons which would be free from the aforementioned drawbacks and would, thus, allow the industry to realize the full potential of this logging method.

A particular object was to provide a detector having a central core of neutron moderating material.

Another object was to provide a detector with a center portion of neutron moderating material of predetermined cross-sectional thickness.

Another particular object was to provide a detector having its scintillating material arranged exterior to its neutron moderating material.

Still another object was to provide a detector having an outer layer of thermal neutron shielding material.

A special object was to provide a detector with scintillating material formed as at least one phosphor between its neutron moderating material and its thermal neutron shield.

Another object was to provide a detector wherein its scintillating material has a predetermined cross-sectional thickness.

Another object was to provide a detector having numerous small rods of scintillating material positioned parallel to and arranged around a core of neutron moderating material.

An alternate object was to provide a detector having at least one circular cylindrical shell of scintillation material formed about a solid cylinder of neutron moderating material.

Another object was to provide a detector which can have its scintillation material formed as phosphors above and/or below a core of neutron moderating material, as well as around the sides thereof.

A further object was to provide a detector having a neutron moderator comprised of substantial amounts of hydrogenous material.

A more specific object was to provide a detector wherein a polyolefin is employed as the neutron moderating material.

Still a further object was to provide a detector which has been specifically designed to use lithium-6 substance as its scintillating material.

A further object was to provide a detector having cadmium as its thermal neutron shielding material.

Still a further object was to construct a detector having an optimum amount of beta-absorbing material formed about individual lateral phosphors (where more than one such phosphor is employed).

Yet a further object was to provide a detector which has lead as its beta-absorbing material.

We are pleased to report that we have accomplished these objects, as well as others, which will become apparent to those skilled in the art from the subsequent discussion, in the invention and discovery of the herein disclosed scintillation detector.

Briefly, our invention comprises a scintillation detector for use in an epithermal neutron logging sonde which detector is characterized by the following design features:

(1) Thermal neutron shielding material located around the periphery of the detector;
(2) Neutron moderating material contained within the center portion of the detector;
(3) Size limitation on the cross-sectional thickness of the neutron moderating material for optimum results;
(4) Scintillating material, which can be formed as one or more phosphors, positioned about the neutron moderating material;
(5) Size limitation on the cross-sectional thickness of the scintillating materal for optimum results;
(6) A lithium-6 containing substance as the scintillating material; and
(7) An optimum amount of a beta-absorbing material around the individual phosphors (where multiple lateral phosphors are employed).

For a detailed discussion of our invention attention is now directed to the drawings wherein.

Figure 1:
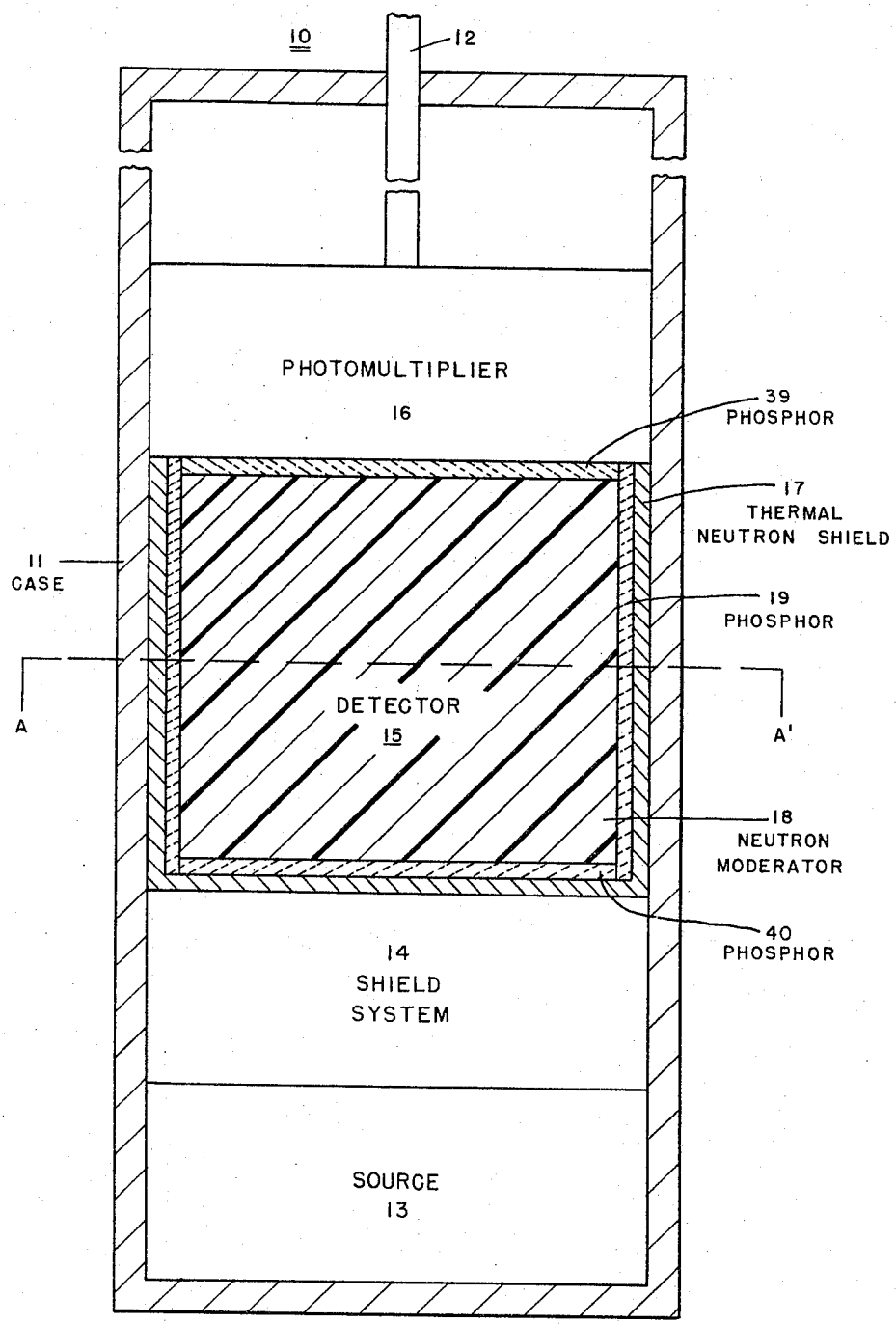
FIGURE 1 is a schematic view showing a longitudinal section of the basic version of our improved scintillation detector.

Before proceeding with the detailed description of the invention, we have defined certain technical terms according to how we have used them in the specification.

"Thermal neutrons" are neutrons in thermal equilibrium with the substance in which they exist and have energies on the order of about 0.025 electron volt or less.

"Epithermal neutrons" have energies from above those of thermal neutrons, i.e., from about 0.30 electron volt, to about 1,000 to 10,000 electron volts.

"Fast neutrons" have energies above the highest energy epithermal neutrons, i.e., energies above about 10,000 electron volts. Their energies may be on the order of 100,000 to 1,000,000 electron volts or even higher.

"Gamma rays" are electromagnetic waves emitted when atomic nuclei disintegrate or rearrange and have energies from about 10,000 to 15,000,000 electron volts.

"Beta particles" are high energy electrons or positrons emitted when nuclei disintegrate.

Referring again to FIGURE 1, logging sonde 10 is shown contained in metal case 11 and supported by uphole electrical connector 12. Case or container 11 preferably is constructed of steel, i.e., iron, however, other metals which have the requisite structural characteristics can be employed. Neutron source 13 which is usually plutonium-beryllium is housed in the lower portion of case 11. Radium-beryllium is another example of a suitable source. Shield system 14 is located above source 13 and protects detector 15 from the direct effects of radiation emitted by source 13. Shield system 14 may be composed of one or more individual components, e.g., steel, hydrogenous material, lead, bismuth, boron, etc. Detector 15 is designed to be responsive to epithermal neutrons coming from borehole formations bombarded by source 13. Photomultiplier 16 is optically coupled to detector 15 and converts scintillations into electrical pulses. Electrical connector 12 carries pulses so produced to a pulse height analyzer system (not shown). Case 11 is shown here in "broken section" to indicate that the pulse height analyzer or other selected equipment can be located in sonde 10 above photomultiplier 16.

Further considering FIGURE 1, one sees that detector 15 in its simplest form consists of thermal neutron shield 17, neutron moderator 18, and lateral phosphor 19. Thermal neutron shield 17 is constructed as a circular cylindrical section with a closed bottom. Its lateral portion fits adjacent case 11 and its bottom portion rests on shield system 14. Shield 17 serves to protect phosphor 19 from thermal neutrons approaching sonde 10 from the borehole and from below. Neutron moderator 18 forms the center portion of detector 15 and acts to thermalize or slow down incident neutrons. It has the shape of a solid circular cylinder. Phosphor 19 is composed of a special scintillating material which is responsive to neutrons from thermal up into the epithermal range and is formed as a separate cylindrical shell between shield 17 and moderator 18. Phosphors 39 and 40 are used in the sophisticated version of detector 15. They are included where it is desired to completely enclose neutron moderator 18 with scintillating material. Phosphor 39 has the shape of a solid disk and should be transparent to scintillations. Phosphor 40 can be shaped as a solid disk (as shown) or combined with phosphor 19 to form a single unit.

Figure 2:
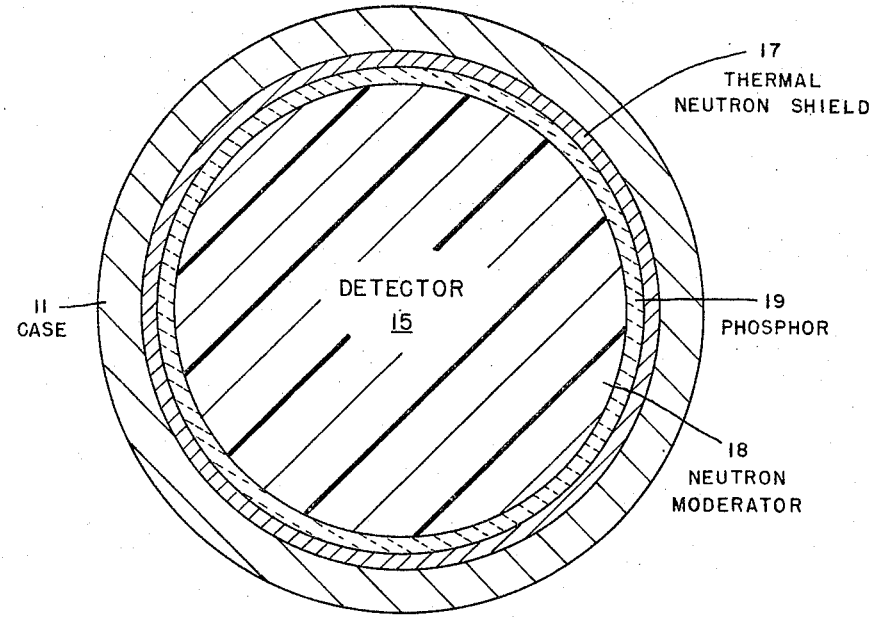
FIGURE 2 is cross-sectional view of our basic detector taken along A–A' of FIGURE 1.

Detector 15 is shown again in FIGURE 2. Thermal neutron shield 17, as seen inside case 11, is constructed thick enough to absorb essentially all of the impinging thermal neutrons. Neutron moderator 18 comprises the core of detector 15. Enough moderating material must be present to thermalize a major portion of the incident epithermal neutrons. Phosphor 19 is positioned between shield 17 and moderator 18. It is most important that the thickness of phosphor 19 be such that neutrons with thermal energies are readily detected while the scintillating material remains largely insensitive to gamma rays with sufficient energies to be mistaken for neutrons.

Figure 3:
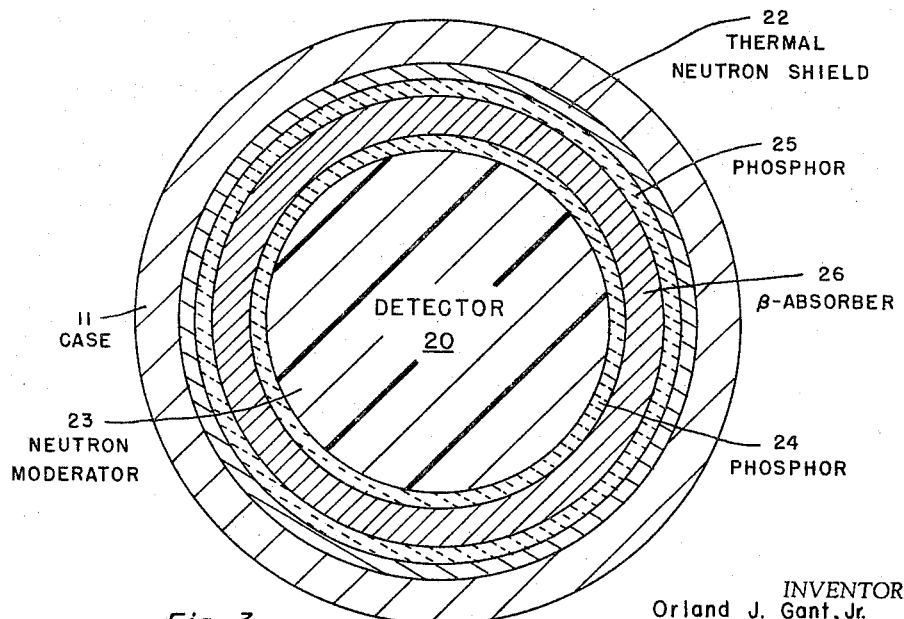
FIGURE 3 is a cross-sectional view showing another embodiment of our invention.

Referring now to FIGURE 3, there is seen a second detector designed in accordance with our invention. Detector 20 is shown contained within metal case 21 and consists of thermal neutron shield 22, neutron moderator 23, lateral phosphors 24 and 25, and beta-absorber 26. Shield 22 is placed around the periphery of the detector and moderator 23 occupies the center portion. Phosphors 24 and 25 are concentric with respect to each other and with thermal neutron shield 22 and neutron moderator 23. Beta-absorber 26 separates phosphors 24 and 25. Obviously, this detector is similar to the one shown in FIGURE 2 with the exception that the scintillating material is formed as two lateral phosphors and a beta-absorbing material has been incorporated. The advantage of the design shown in FIGURE 3 is that neutrons not detected by one phosphor may still be detected by the other. A further advantage is the reduced gamma ray sensitivity achieved by reducing the thickness of each phosphor. The purpose of beta-absorber 26 is to prevent high energy electrons such as could result from gamma ray interaction in one phosphor from reaching other phosphors (where they could falsely be interpreted as neutrons that at incidence were epithermal).

Figure 4:
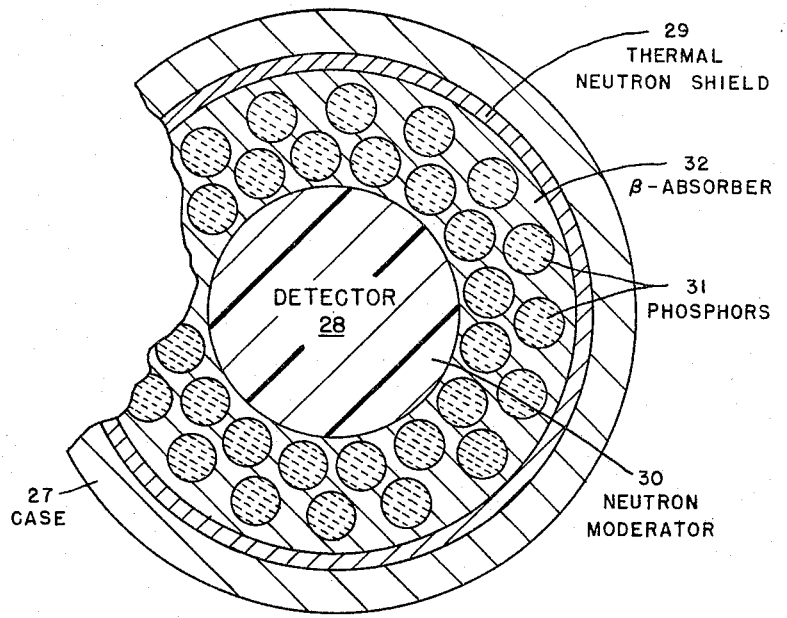
FIGURE 4 is a cross-sectional view presenting an alternate embodiment for our invention.

Referring next to FIGURE 4, there is seen another embodiment of the present invention. Metal case 27 holds detector 28 which is comprised of thermal neutron shield 29, neutron moderator 30, lateral phosphors 31, and beta-absorber 32. Phosphors 31 are rod-shaped and are evenly dispersed within beta-absorber 32, i.e., between moderator 30 and neutron shield 29 parallel to moderator 30. This detector has improved shock resistance and has been designed to allow for easy replacement of faulty phosphors.

Figure 5:
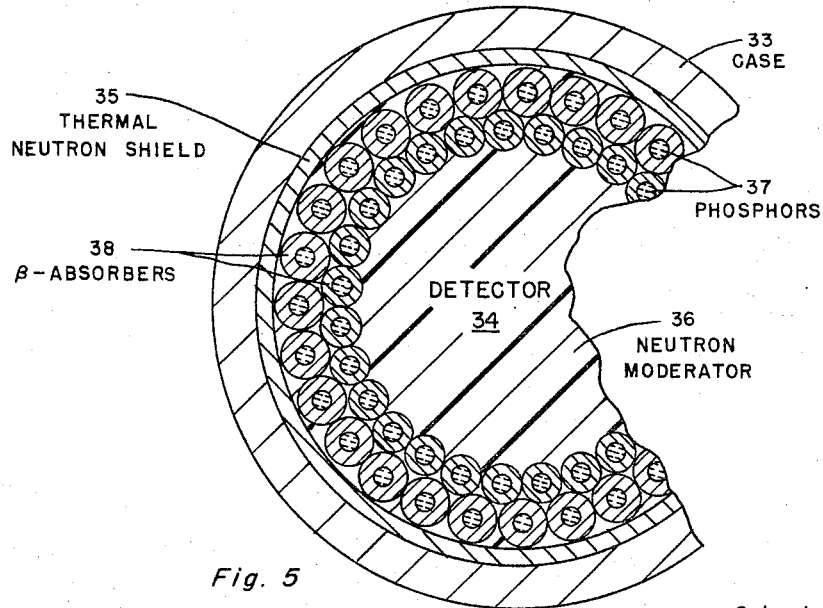
FIGURE 5 is a cross-sectional view showing another alternate design for our invention.

Reference is now made to FIGURE 5 for still another embodiment of our invention. Metal case 33 contains detector 34 which is comprised of thermal neutron shield 35, neutron moderator 36, lateral phosphors 37, and beta-absorbers 38. This detector is similar to the one shown in FIGURE 4, with the exception that each phosphor is surrounded by a separate tube of beta-absorbing material and the area between the individual beta-absorbers is filled with neutron moderating material. This design has particular advantage where the scintillating material is hygroscopic since phosphors 37 can be separately housed in air-tight containers.

Referring generally to FIGURES 3, 4, and 5, it is understood that the thermal neutron shielding material is formed in all cases around the sides and bottom portion of each detector. Also, we wish to emphasize that phosphors, in addition to the described lateral phosphors, can be located above and/or below the neutron moderator in each embodiment.

Now let us consider the component elements of our improved scintillation detector in more detail.

The thermal neutron shields are formed of a material that has a high cross-section for capturing neutrons with thermal energies and a relatively low absorption cross-section for epithermal neutrons. The best material for this purpose is cadmium, however, gadolinium is also used to some extent. Cadmium, of course, is much preferred due to its high neutron capture cross-section, its sharp "cut-off" at about 0.30 electron volt, and because it has few and low resonances in the epithermal region.

Epithermal neutrons lose energy mainly by elastic collisions with other nuclei. From considerations of momentum transfer, this process is most effective for target nuclei of about the same mass, i.e., hydrogen nuclei, though other light nuclei are also effective. It follows that materials rich in hydrogen such as plastics are preferred neutron moderators. Particularly preferred among these are polyolefins such as polyethylene and polypropylene.

The phosphors used in our detector are composed of lithium-6 (i.e., $Li^6$) scintillating material. On capturing a neutron lithium-6 undergoes an exoergic reaction forming product nuclei which have a total energy of 4.78 million electron volts. This results in scintillation pulses of essentially constant size which may be detected against a gamma ray background. Specifically, we highly recommend the use of europium activated lithium-6 iodide or lithium-6 loaded glass. Phosphors made with these materials can be made thin enough to be essentially gamma ray insensitive and yet have satisfactory response to low energy neurons. The major portion of the scintillation material must be placed in our detector lateral to the neutron moderator. Material not so placed can be located above and/or below the neutron moderator.

When a beta-absorbing material is incorporated in our detector, a material should be used which is essentially transparent to thermal neutrons. While it would be possible to employ hydrogenous material such as is used for the neutron moderator, lead or aluminum is generally preferred. Lead offers particular advantage because it has very high beta-stopping power.

Now let us more fully consider the various size limitations and spacing arrangements imposed on our detector.

The thermal neutron shield should be on the order of about 0.02 inch to 0.04 inch thick with about 0.03 inch being preferred.

The diameter of the neutron moderator should be on the order of about 1.5 to 3.0 inches for best results since thermalization will be less than optimum where the diameter is much less than 1.5 inches and thermalized neutrons will be captured by the moderator where the 3.0 inch diameter is exceeded to any extent.

Lateral scintillating material should be as evenly dispersed between the thermal neutron shield and the neutron moderator as possible. Thus, the neutron moderating material should be essentially bounded by a "ring" of the scintillating material whatever the particular shape and arrangement of the phosphor or phosphors. As already stated, the scintillating material must be present in only a thin layer to prevent gamma ray sensitivity; however, close to 100 percent efficiency for thermalized neutrons still must be maintained. In each instance, the optimum thickness will depend largely on what material is used and which configuration is chosen. For example, where a single shell cylindrical phosphor is employed (FIGURES 1 and 2) the wall thickness may range from about 0.07 inch to 0.15 inch. Where there are two concentric shell phosphors (FIGURE 3) each shell need have a wall only 0.05 inch to 0.10 inch thick. By way of further example, where the phosphors are formed as multiple rods (FIGURES 4 and 5) the rod diameters should be about 0.07 inch to 0.15 inch. Where there are upper and/or lower plates of scintillating material, these plates should be from 0.70 to 0.15 inch thick.

We mentioned earlier that if several phosphors are used lateral to the neutron moderating material, some space must be left between the separate units to minimize gamma ray response by eliminating beta energy absorption in more than one unit. Preferably, the individual phosphors are covered with about 0.05 to 0.10 inch thickness of beta-absorbing material rather than merely being spaced apart. Protective sleeves of this thickness are capable of absorbing the interfering beta particles without capturing the thermalized neutrons.

Let us now review the over-all operation of our improved scintillation detector. Our epithermal neutron detector is incorporated in a logging tool containing a source of neutrons. With the logging tool in a borehole, an earth formation is bombarded by neutrons. Some neutrons from the formation reach the detector. Neutrons of thermal energies reaching the detector are captured by the external thermal neutron shield. Fast neutrons encountering the detector are reduced in energy by the internal neutron moderating material but not enough to be subsequently captured. Epithermal neutrons encountering the detector pass freely through the thermal neutron shield. Some are immediately captured by the scintillating material. Those of about five electron volts or greater are likely to pass through the scintillating material and encounter the neutron moderating material. Here many are thermalized and others are reduced to energies of a few electron volts or less. The thermalized neutrons diffuse through the moderating material and a high precentage are captured by the scintillating material. Thermalized neutrons not captured by the scintillating material are captured instead in the moderating material or diffuse to the thermal neutron shield where they are captured. Many of the neutrons with lowered energy but above thermal energy are also detected by the scintillating material (or are absorbed by the thermal neutron shield). The scintillating material produces light flashes when neutrons are captured which are converted into electrical pulses by the photomultiplier.

Obviously, the scintillation detector we have disclosed can be modified in various ways and remain within the scope of our invention. For instance, long scintillators generally have poor light transmission. In such cases it may be advisable to use a transparent hydrogenous core such as lucite as the neutron moderating material to improve transmission.

Another design change which would be useful in some instances would be to reduce the moderation effect by removing the center portion of the neutron moderating material. This space could be left vacant or, advantageously, scintillating material could be inserted. This design would increase efficiency under certain conditions.

Undoubtedly others skilled in the art will be able to propose still other changes and modifications which will be of value in solving their particular problems.

What is claimed is:

1. A scintillation detector coupled to a photomultiplier and contained in a logging sonde above a neutron source for detecting epithermal neutrons comprising
   (a) a thermal neutron shield forming the sides and bottom portion of said detector,
   (b) a neutron moderator substantially cylindrical in shape occupying the center portion of said detector, and
   (c) a plurality of solid rod-shaped phosphors laterally disposed between said shield and said moderator such that they are parallel to the longitudinal axis of said moderator.

2. A detector according to claim 1 where the diameter of the neutron moderator is about 1.5 to 3.0 inches.

3. A detector according to claim 1 where beta-absorbing material is positioned between said phosphors.

4. A scintillation detector coupled to a photomultiplier and contained in a logging sonde above a neutron source for detecting epithermal neutrons comprising
   (a) a thermal neutron shield forming the sides and bottom portion of said detector,
   (b) a neutron moderator substantially cylindrical in shape occupying the center portion of said detector,
   (c) a plurality of concentrically arranged phosphors each in the shape of a solid cylindrical shell laterally disposed between said shield and said moderator, and
   (d) beta-absorbing material positioned between said phosphors.

5. A detector according to claim 4 where the diameter of the neutron moderator is about 1.5 to 3.0 inches.

References Cited

UNITED STATES PATENTS

| | | | |
|---|---|---|---|
| 2,769,915 | 11/1956 | Tittle | 250—71.5 |
| 2,920,204 | 1/1960 | Youmans | 250—83.1 |
| 3,032,657 | 5/1962 | Meier et al. | 250—71.5X |
| 3,032,658 | 5/1962 | Youmans | 250—71.5 |
| 3,238,369 | 3/1966 | Kronenberg | 250—83.1 |

ARCHIE R. BORCHELT, *Primary Examiner.*